(12) United States Patent
Durvasula et al.

(10) Patent No.: US 7,690,811 B2
(45) Date of Patent: Apr. 6, 2010

(54) SYSTEM FOR IMPROVED BACKLIGHT ILLUMINATION UNIFORMITY

(75) Inventors: Ravi Shankar Durvasula, Rexford, NY (US); Mark Marshall Meyers, Mechanicville, NY (US); Peter William Lorraine, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 91 days.

(21) Appl. No.: 11/561,182

(22) Filed: Nov. 17, 2006

(65) Prior Publication Data
US 2008/0117630 A1  May 22, 2008

(51) Int. Cl.
*F21V 5/00* (2006.01)

(52) U.S. Cl. .................. 362/246; 362/624; 362/625; 362/626; 362/355

(58) Field of Classification Search .......... 362/246, 362/241, 606, 614, 355, 618–620, 624–626, 362/97.1, 97.4
See application file for complete search history.

(56) References Cited

U.S. PATENT DOCUMENTS

| | | | |
|---|---|---|---|
| 5,050,946 A | | 9/1991 | Hathaway et al. |
| 5,134,549 A | * | 7/1992 | Yokoyama .............. 362/623 |
| 5,202,950 A | | 4/1993 | Arego et al. |
| 5,394,308 A | * | 2/1995 | Watanabe et al. ........ 362/613 |
| 5,886,759 A | * | 3/1999 | Mashino et al. ........... 349/65 |
| 5,961,198 A | * | 10/1999 | Hira et al. .............. 362/621 |
| 6,417,897 B1 | * | 7/2002 | Hashimoto ............... 349/65 |
| 6,530,671 B2 | * | 3/2003 | Yaniguchi et al. ........ 362/619 |
| 6,612,722 B2 | * | 9/2003 | Ryu et al. ............... 362/331 |
| 7,140,743 B2 | | 11/2006 | Yang |
| 2004/0105044 A1 | * | 6/2004 | You ...................... 349/58 |
| 2004/0114347 A1 | * | 6/2004 | Leu et al. ............... 362/31 |
| 2004/0228109 A1 | * | 11/2004 | Leu et al. ............... 362/31 |
| 2005/0141243 A1 | * | 6/2005 | Mullen et al. ........... 362/600 |
| 2005/0201121 A1 | * | 9/2005 | Chen et al. ............. 362/615 |
| 2005/0259438 A1 | * | 11/2005 | Mizutani et al. ......... 362/612 |
| 2005/0275766 A1 | * | 12/2005 | Liu et al. ................ 349/64 |
| 2006/0164840 A1 | * | 7/2006 | Song et al. ............. 362/341 |
| 2006/0256580 A1 | * | 11/2006 | Kang et al. ............. 362/614 |
| 2007/0041182 A1 | * | 2/2007 | Ge et al. ................ 362/184 |
| 2007/0159848 A1 | * | 7/2007 | Yang et al. ............. 362/608 |
| 2007/0201245 A1 | * | 8/2007 | Chang .................. 362/627 |
| 2008/0037281 A1 | * | 2/2008 | Chang .................. 362/615 |
| 2008/0285308 A1 | * | 11/2008 | Clary et al. ............. 362/619 |

FOREIGN PATENT DOCUMENTS

JP         06130378 A2    5/1994
WO    WO 2005/031446 A1    4/2005

* cited by examiner

*Primary Examiner*—Sandra L O'Shea
*Assistant Examiner*—Evan Dzierzynski
(74) *Attorney, Agent, or Firm*—Mary Louise Gioeni (57) ABSTRACT

An illumination system includes a backlight housing, a plurality of light valves coupled to the backlight housing, and a plurality of light sources arranged in the backlight housing and optically coupled to the light valves. The illumination system may further include a light-scattering substrate optically coupled between the plurality of light sources and the light valves, and a plurality of light modulating dots patterned on the substrate to modulate transmitted intensity of light from the plurality of light sources to achieve increased luminance uniformity by decreasing banding caused by the separated light sources. The light modulating dots may include comprise reflective dots, transmissive dots, absorptive dots, or a combination thereof.

38 Claims, 5 Drawing Sheets

SYSTEM FOR IMPROVED BACKLIGHT ILLUMINATION UNIFORMITY

BACKGROUND

Embodiments of the invention relate generally to a system for improved backlight illumination uniformity in display devices.

Large format display devices, such as flat panel liquid crystal displays (LCDs) typically utilize cold cathode fluorescent lamps (CCFL) as light sources. Although CCFLs have small form factors (with diameters typically in the 2.6 to 3.0 mm range) CCFLs have relatively low luminous efficiency and are fragile at longer lengths. As display panel screen diagonals continue to increase there is also an increasing need for mechanically robust, high luminous efficiency light sources to illuminate such displays.

More recently, hot cathode fluorescent lamps (HCFL) have been used as light sources for such flat panel displays. The use of HCFL's allows for current pulsing of the light output which allows for the reduction of motion blur caused by the finite lag time for the LCD pixel to change state between image frames. HCFLs further provide higher luminous efficiency than CCFLs and are more mechanically robust for longer tube lengths (having typical diameters of around 16 mm). However, since the trend in flat panel displays is to reduce panel depth and HCFLs have larger diameters than CCFLs, the HCFLs tend to occupy more space within the backlight cavities of the display panels. This causes greater non-uniformity in the illumination under the LCD screen in the form of banding, which is generally objectionable to end users. Furthermore, since the trend in flat panel displays is to reduce panel depth there is a general desire to increase uniformity of illumination without significantly increasing the depth of the backlight cavity.

BRIEF DESCRIPTION

In one embodiment, an illumination system includes a backlight housing, a plurality of light valves coupled to the backlight housing, and a plurality of light sources arranged in the backlight housing and optically coupled to the light valves. The illumination system may further include a light-scattering substrate optically coupled between the plurality of light sources and the light valves, and a plurality of light modulating dots patterned on the substrate to modulate transmitted intensity of light from the plurality of light sources to achieve increased luminance uniformity by decreasing banding caused by the separated light sources.

In another embodiment an optical diffuser includes a light-scattering substrate and a plurality of light modulating dots patterned on the substrate to modulate transmitted intensity of light from a light source to achieve increased luminance uniformity by decreasing banding caused by widely separated light.

In one embodiment, the light modulating dots may include comprise reflective dots, transmissive dots, absorptive dots, or a combination thereof.

DRAWINGS

The present invention will be understood more fully when the following detailed description is read with reference to the accompanying drawings of various embodiments of the invention, which should not be taken as limiting, but are for explanation and understanding, and in which like characters represent like parts throughout the drawings.

DETAILED DESCRIPTION

In accordance with one or more embodiments of the present invention, systems and methods for improving illumination uniformity are described herein. In the following detailed description, numerous specific details are set forth in order to provide a thorough understanding of various embodiments of the present invention. However, those skilled in the art will understand that embodiments may be practiced without these specific details, that the present invention is not limited to only the depicted embodiments, and that the present invention may be practiced in a variety of alternative embodiments. In other instances, well known methods, procedures, and components have not been described in detail. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
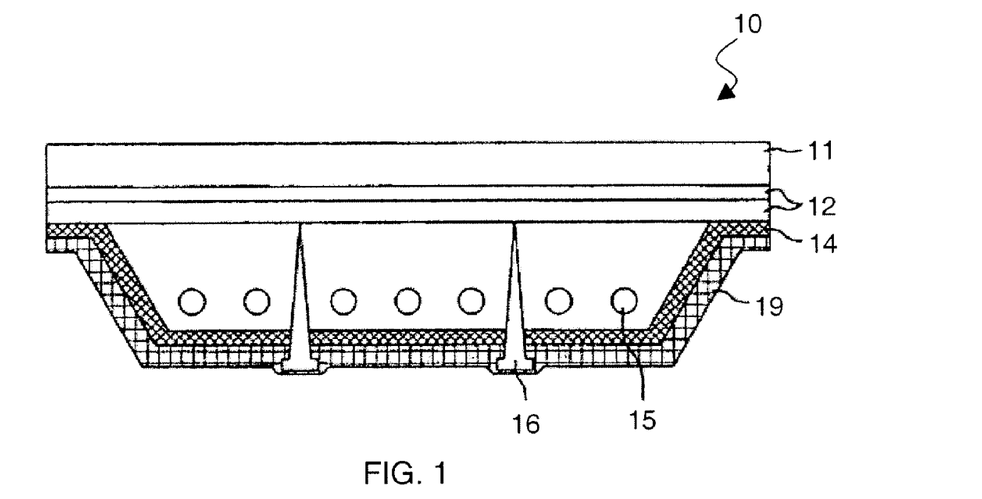
FIG. 1 is a cross-sectional view of an example illumination system 10 in accordance with one embodiment.

FIG. 1 is a cross-sectional view of an example illumination system in accordance with one embodiment. In FIG. 1, an illumination system 10 includes a backlight housing 19, a plurality of light valves 11 coupled to the backlight housing 19 and a plurality of separated light sources 15 arranged in the backlight housing 19 and optically coupled to the light valves 11. The illumination system 10 further includes at least one light-scattering substrate 12 optically coupled between the plurality of light sources 15 and the light valves 11, and a plurality of supports 16 to provide support to the light-scattering substrate(s) 12.

The light valves may be a transmissive or a reflective light valve array such as a liquid crystal display (LCD) including pixel apertures that are individually controllable to modulate transmissivity of light produced by the plurality of light sources 15. In addition, the light-scattering substrate(s) 12 may be included between the light valves 11 and the plurality of light sources 15 to increase illumination uniformity of the light produced by the plurality of light sources 15. In accordance with one embodiment to be described in further detail below, the illumination system 10 is equipped with a plurality of light modulating dots patterned on one or more light-scattering substrates 12 to modulate transmitted intensity of light from the plurality of light sources 15 to achieve increased luminance uniformity.

The backlight housing 19 may vary in size and form factors depending upon e.g., the intended application of the illumination system. For example, in the event the illumination system 10 is intended for use as an LCD television, the length and width of the backlight housing may be sized to accommodate LCD panels ranging from about 50 to 200 cm and even larger. However, even as the diameter of the backlight housing 19 has increased to accommodate such larger LCD panels, the depth of the backlight housing 19 (e.g., the space within which the plurality of light sources 15 are positioned) has continued to remain on the order of about 25 mm.

The backlight housing 19 may be equipped with one or more reflectors 14 formed below or between the plurality of light sources 15 in order to reflect the light emitted from the plurality of light sources 15 back to the light valves 11. The reflector(s) may take the form of e.g., a single reflective metallic plate or plastic reflector with a coating, and may be evenly distributed between the backlight housing 19 and light sources 15. Alternatively, the reflector(s) 14 may be located between the backlight housing 19 and light sources 15 as a function of light source location. For example, in one embodiment one or more reflector(s) 14 may be positioned between each of the light sources 15 to further increase illumination uniformity across the illumination system 10 by reflecting or scattering additional light to the lower intensity areas on light-scattering substrate(s) 12.

Figure 2:
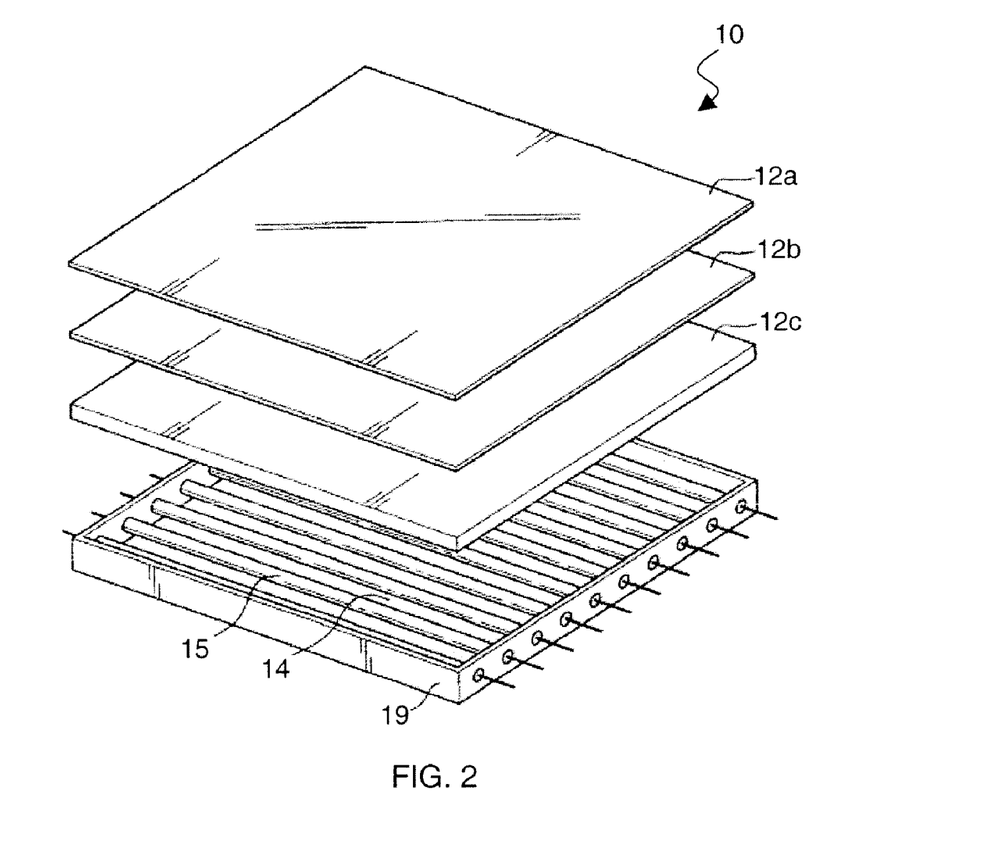
FIG. 2 is a perspective view of an example illumination system 10 in accordance with one embodiment.

FIG. 2 is a perspective view of an example illumination system such as illumination system 10 of FIG. 1, in accordance with one embodiment. In FIG. 2, the illustrated illumination system includes the light sources 15, arranged at fixed intervals in backlight housing 19, and the reflector 14 provided at least partially between the backlight housing 19 and the light sources 15. Furthermore, three light-scattering substrates (diffusers) 12a, 12b, and 12c are illustrated and are optically coupled between the light valves 11 (not shown) and the plurality of light sources 15. The light-scattering substrates 12a, 12b, and 12c may include one or more diffusion films, sheets or plates and may be independently or collectively referred to as a diffuser. In one embodiment, one or more of light-scattering substrate 12a, 12b, and 12c may include a polycarbonate resin. In one embodiment, light-scattering substrate 12c, may be a relatively thick plate having a thickness of about 2 mm, whereas each of light-scattering substrates 12a and 12b may be a thin film having a thickness of about 0.2 mm. In one embodiment, light-scattering substrate 12c may be a thick volumetric scattering diffuser such as GE part number SW2005 available from GE Plastics, Pittsfield Mass., whereas light-scattering substrates 12a and 12b may be an ILLUMINEX brand display film grade DL4251 or DL4250 also available from GE Plastics.

In accordance with one embodiment, the plurality of light sources 15 may include one or more fluorescent lamps. In a more particularized embodiment, the light sources 15 may include one or more hot cathode fluorescent lamps (HCFL) such as a T5 lamp having electrodes at both ends of the lamps. Accordingly, the plurality of light sources 15 emit light when voltage is supplied to the electrodes at both ends of the plurality of light sources 15.

Figure 3:
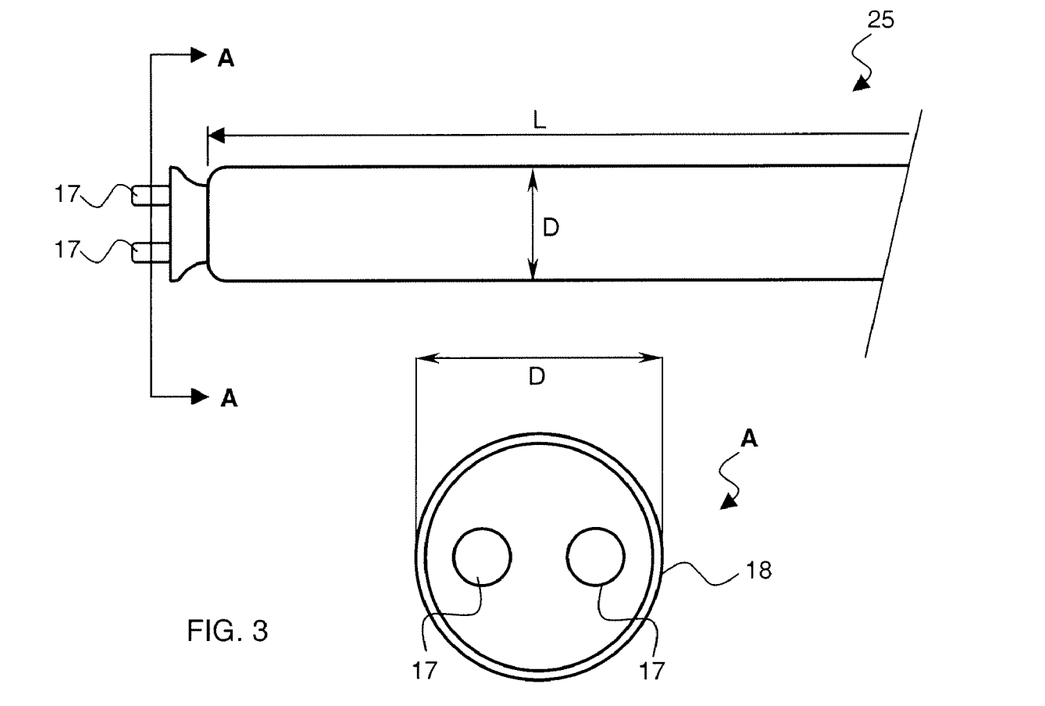
FIG. 3 is a schematic diagram illustrating an example T5 hot cathode fluorescent lamp (HCFL), suitable for use as light source 15 in accordance with embodiments of the present invention.

FIG. 3 is a schematic diagram illustrating an example T5 hot cathode fluorescent lamp (HCFL) 25, suitable for use as light source 15 in accordance with embodiments of the present invention. In order to provide a more detailed view, only the leftmost portion of HCFL 25 is illustrated. At each of its ends, HCFL 25 includes an outer body 18 and two electrodes 17 to provide a voltage source to the lamp. HCFL 25 may be characterized as having a length 'L' and a width or diameter 'D'. In one embodiment the diameter of HCFL 25 is about 16 mm, whereas the length may vary depending upon the intended application. When used in connection with an LCD backlight for example, the length may vary depending upon the diameter of the backlight housing 19 or the light valves (e.g., LCD panel) 11.

Figure 4:
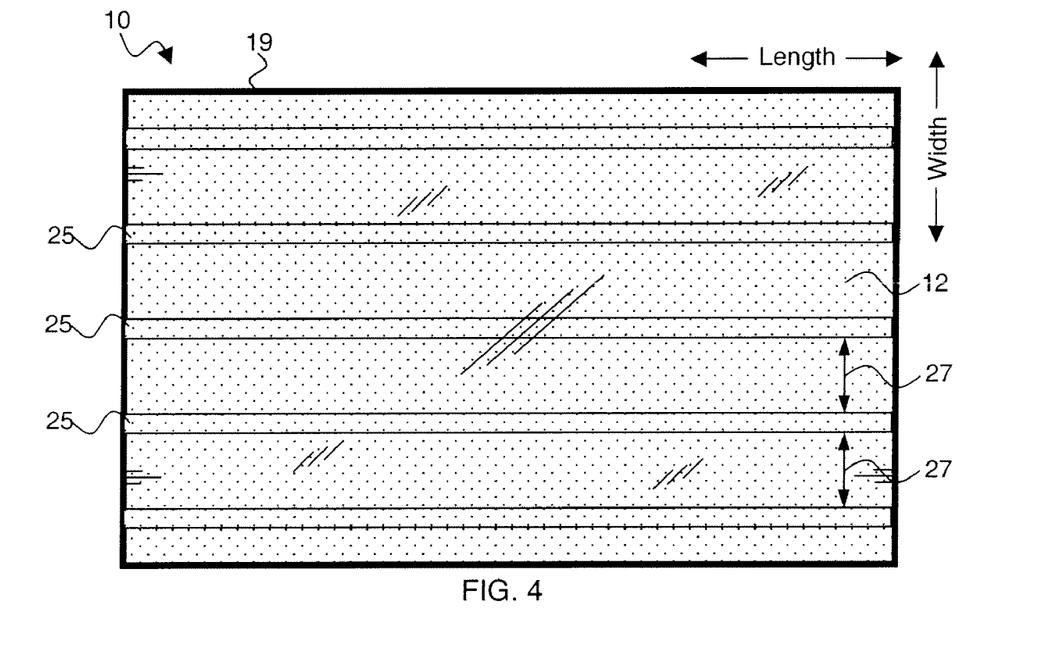
FIG. 4 is a schematic diagram illustrating a front view of illumination system 10 in accordance with one embodiment of the present invention.

FIG. 4 is a schematic diagram illustrating a front view of illumination system 10 in accordance with one embodiment of the present invention. The illumination system 10 includes the previously described backlight housing 19 and a plurality of hot cathode fluorescent lamps (HCFL) 25. The hot cathode fluorescent lamps 25 may be arranged substantially in a plane that is parallel to the light valves 11 and may extend in a lengthwise direction 'L' behind the light valves from one side of the backlight housing 19 to the other as shown. The hot cathode fluorescent lamps 25 may be separated from each other by a fixed distance or by distances that vary across the width of the illumination system 10. In the illustrated embodiment of FIG. 4, the hot cathode fluorescent lamps 25 are separated by a fixed distance 27.

The illumination system 10 of FIG. 4 further includes a light-scattering substrate 12 (as previously described), to increase illumination uniformity of the light produced by the plurality of light sources. However, because the diameter of the hot cathode fluorescent lamps 25 is much larger than the diameter of the cold cathode fluorescent lamps (e.g., 16 mm for a T5 lamp versus 2.6-3.0 mm for a CCFL lamp) more conventionally used for flat panel backlighting, light banding is possible even through the light-scattering substrate 12 since the top of the lamp is much closer to the bottom of the light-scattering substrate. More specifically, for the CCFL lamps, 88% of the cavity depth of the backlight housing is above the top of the CCFL lamp and below the diffuser, whereas for the T5 lamp only 48% of the backlight cavity depth is above the lamp and below the light-scattering substrate 12.

In accordance with one embodiment, the illumination system 10 is equipped with a plurality of light modulating dots patterned on the light-scattering substrate 12 to modulate transmitted intensity of light from the hot cathode fluorescent lamps 25 to achieve increased luminance uniformity by decreasing banding caused by the separated hot cathode fluorescent lamps 25. Unless otherwise stated, the term "dot" is intended to broadly refer to a small mark or inclusion. The light modulating dots may be substantially round, however such dots may also include other shapes including but not limited to square, elliptical, trapezoidal, or any other geometric/polygonal form. Moreover, such dots may be circular and have a diameter, whereas others may be slightly elliptical and have a major and a minor axis. In one embodiment the light modulating dots are smaller than the pixel aperture area of an associated LCD panel, which may typically have aperture areas of about 200 μm to about 500 μm. In one embodiment, the light modulating dots may have a dot width or diameter that is less than about 300 μm. In a more particular example, the light modulating dots may have a dot area that is equal to or less than one-third the size of the LCD pixel area. In one embodiment, the light modulating dots may have a dot width or diameter of about 150 μm. In one embodiment, the light modulating dots are comprised of paint or ink that incorporates highly reflective and scattering substances such as titanium dioxide (e.g., $TiO_2$) or aluminum oxide (e.g., $AlO_2$). Additionally, the light modulating dots may be formed on a light-scattering substrate such as an optical diffuser in a variety of methods either known or to be developed. For example, the light modulating dots may be printed on a diffuser through silk-screening, ink jet printing, or paint dot on demand printing. Silk screening allows for rapid printing of the whole surface in one operation, whereas ink jet and dot on demand printing require the printer to access each spot location individually.

In one embodiment, the light modulating dots described herein may include reflective dots, scattering transmissive dots, absorptive dots, and combinations thereof. The reflective dots may be specular or diffuse and may generally reflect light emitted from light sources, such as the hot cathode fluorescent lamps 25, back towards the lamps and the backlight housing 19. The light reflected from an area over the lamps will be scattered and diffused over the area between the lamps, thus increasing the intensity between the lamps. The transmissive dots scatter light emitted from the light sources in a forward direction substantially away from the lamps and the backlight housing. In contrast, absorptive dots at least partially absorb light emitted from light sources such as the hot cathode fluorescent lamps 25. Absorptive dots can be modulated and spaced so that some of the light directly over the lamps is absorbed so that the overall illumination uniformity is improved. In certain embodiments, the light modulating dots may be partially transmissive, partially reflective or partially absorptive. For example, the light modulating dots may include partially transmitting dots that exhibit e.g., 50-95% reflectivity. Such partially transmitting dots may be less visible by a viewer when viewed through the bulk of the diffuser.

In one embodiment, the transmissive dots may include micro or nano spheres (or inclusions) having a mismatched index of refraction as compared to that of the surrounding scattering substrate 12. The use of spheres with higher or lower refractive index embedded in the substrate/diffuser or attached to the surface of the diffuser allows the spheres to focus light within controlled cone angles. Parameters which impact the nature of the resulting scatter are the size of the spheres (or inclusions), their refractive index, and their density. The spheres can be made in sizes from 100 nm to 500 µm and can be comprised of various materials including silica and polystyrene. The spheres can also be made hollow to maximize the refractive index change from the surrounding substrate. The density of the microspheres or inclusions can be modulated and spaced so as to have increased scattering directly over the lamps and reduced scattering over the spaces between the lamps in order to enhance the overall illumination uniformity.

The light modulating dots may be formed in or on one or more surfaces of a single light-scattering substrate (e.g., 12a, 12b, 12c) or the light modulating dots may be layered on more than one light-scattering substrate. Moreover, the light modulating dots may be formed between two or more layers of a light-scattering substrate 12. As previously described, the light-scattering substrate 12 may represent a diffuser that is at least partially formed from a polycarbonate resin.

Furthermore, the light modulating dots may be arranged in a light modulating dot pattern. In one embodiment, the light modulating dot pattern may be characterized as having a pattern length and a pattern width, whereby the pattern length is defined to be parallel to the lengthwise direction 'L' of the hot cathode fluorescent lamps 25 and the pattern width is defined to be orthogonal to the lengthwise direction 'L' of the hot cathode fluorescent lamps 25. In one embodiment, the light modulating dots may be formed in a pattern such that the resulting light modulating dot pattern width is greater than the width or diameter of the corresponding light sources. For example, when used in association with hot cathode fluorescent lamps 25, the light modulating dot pattern width may be greater than 16 mm, which is the diameter of a T5 lamp. In one embodiment, the light modulating dot pattern width may be smaller than twice the diameter of the corresponding light sources. In one embodiment, the light modulating dot pattern width may be about 25 mm.

In one embodiment, the light modulating dot pattern is repeated as a function of lamp location. For example, in FIG. 4 each repeated light modulating dot pattern may be centered over a corresponding hot cathode fluorescent lamp 25. Moreover, each repeated light modulating dot pattern may begin and end at approximately one half the distance 27 separating each hot cathode fluorescent lamp 25. In other embodiments the light modulating dot pattern may be extended up to 100% of the spacing between lamps.

In one embodiment, the intensity transmittance of light emitted from the plurality of light sources such as hot cathode fluorescent lamps 25 may be modulated by the diffuser utilizing reflective dot spacing or dot area, or a combination thereof. In one embodiment, spacing between the light modulating dots may vary as a function of the distance from the lamp center along the lamp width or diameter and in a direction orthogonal to the lengthwise direction as e.g., illustrated in FIG. 4.

Figure 5:
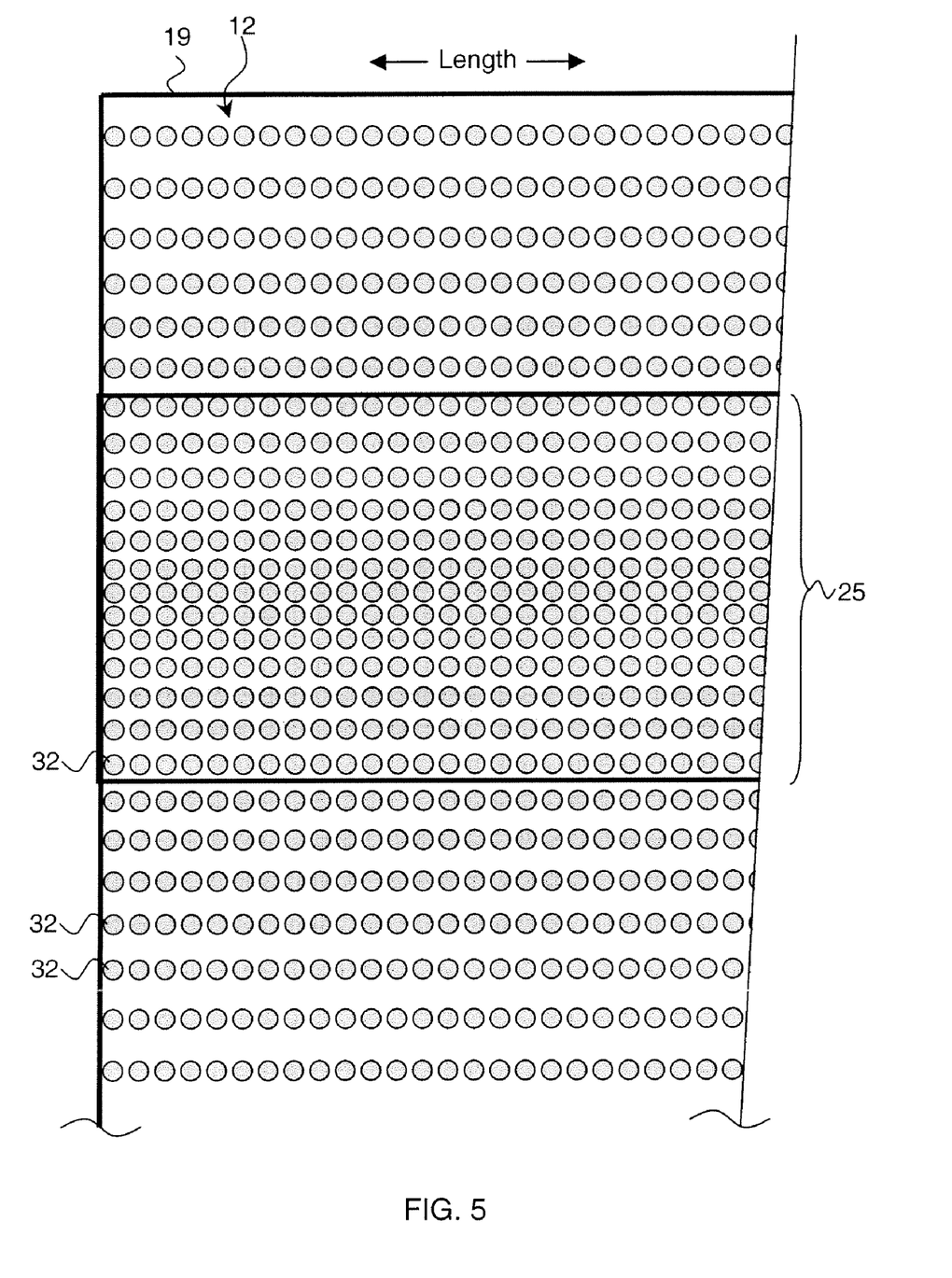
FIG. 5 illustrates a cut-away portion of an illumination system including light modulating dots formed in a space-modulated pattern as a function of light source location according to one embodiment.

FIG. 5 illustrates a cut-away portion of an illumination system including light modulating dots formed in a space-modulated pattern as a function of light source location according to one embodiment. The illustrated portion of the illumination system of FIG. 5 includes backlight housing 19, a single hot cathode fluorescent lamp 25, and a light-scattering substrate 12 including light modulating dots 32 formed in a space-modulated pattern. In the illustrated embodiment, the spacing between the light modulating dots 32 varies as a function of the width/diameter of the hot cathode fluorescent lamp 25 and in a direction orthogonal to the lengthwise direction of the lamp. Accordingly, light scattering over the light sources such as the hot cathode fluorescent lamp 25 is increased as compared to light scattering over spaces separating such light sources. In one embodiment, the light modulating dots are spaced in accordance with the functions:

$$Px(i)=A+B*(x/Ni)+C*(x/Ni)^2+D*(x/Ni)^3$$

$$Py(j)=G*(y/Nj),$$

which represent the distance from the center of the lamp to the location of the $i^{th}$ dot laterally and the $j^{th}$ dot longitudinally. The equation for the location of the light modulating dot can be of the form of a polynomial of up to $10^{th}$ order terms, but generally a quadratic equation is sufficient to correct for the lateral variations and longitudinally the spacing is simply linear.

Figure 6:
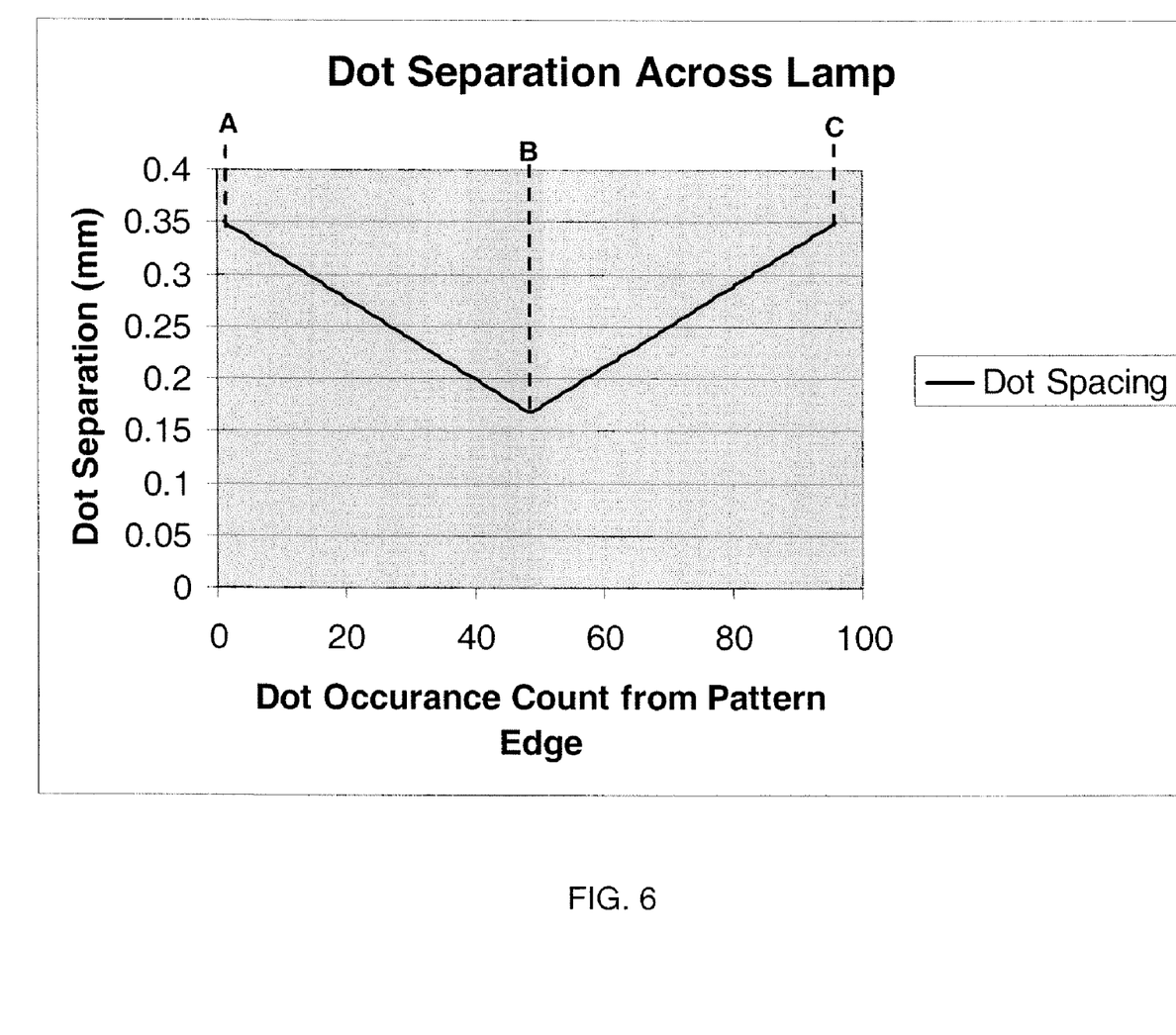
FIG. 6 is a plot illustrating light modulating dot spacing as a function of lamp position as represented by the dot occurrence count from the light modulating dot pattern edge, according to one embodiment.

FIG. 6 is a plot illustrating light modulating dot spacing as a function of lamp position as represented by the dot occurrence count from the light modulating dot pattern edge, according to one embodiment. With reference to the plot it can be seen that the spacing between the dots increases from point 'B' corresponding to the center of a light source such as the hot cathode fluorescent lamp 25 out to point 'A' and point 'C' each corresponding to the beginning or end of a light modulating dot pattern for a given light source.

Figure 7:
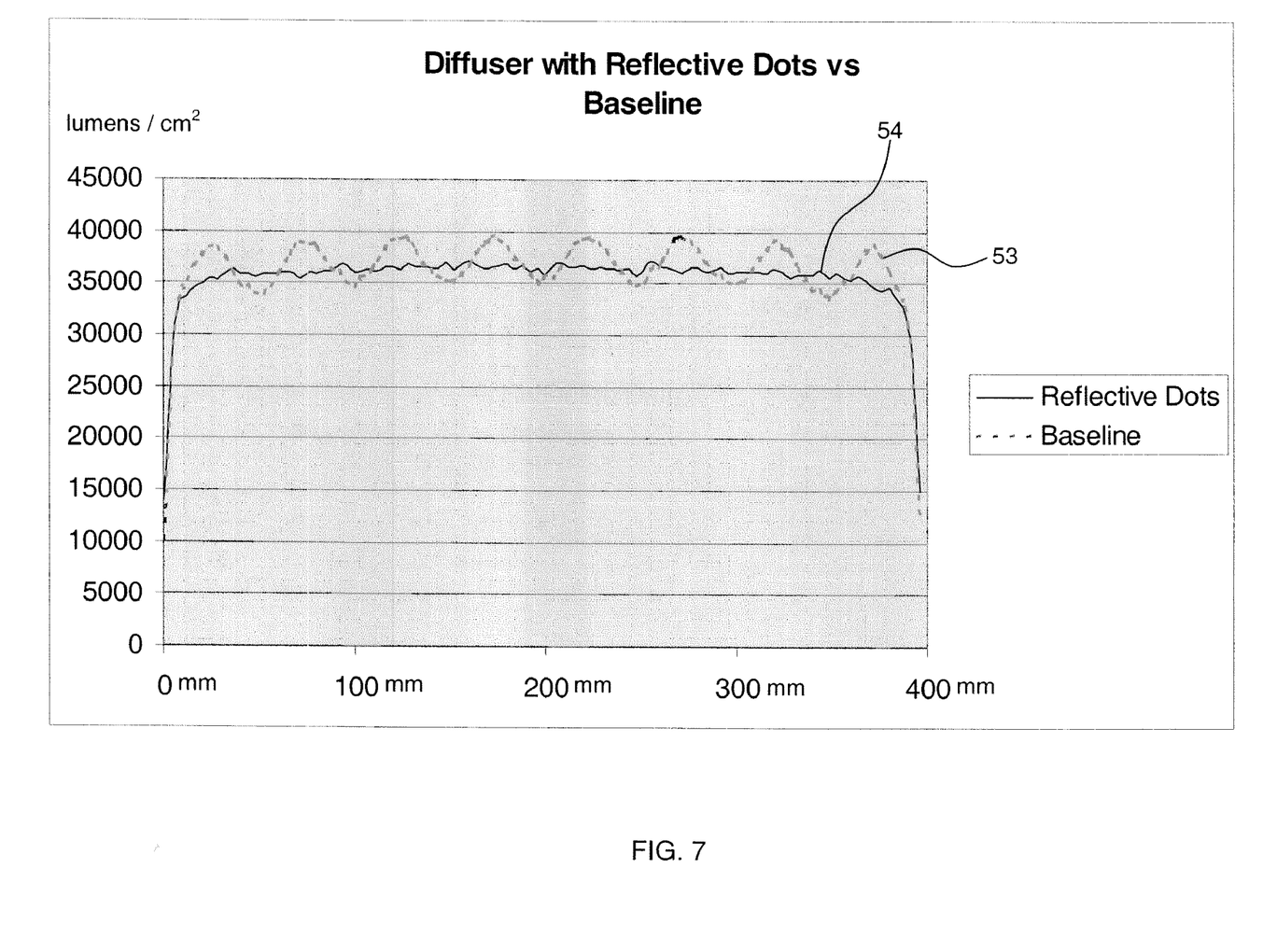
FIG. 7 is a plot illustrating luminance of an illumination system without light modulating dots and an illumination system equipped with a diffuser including the light modulating dots in accordance with one embodiment of the invention.

FIG. 7 is a plot illustrating luminance of an illumination system without light modulating dots and an illumination system equipped with a diffuser including the light modulating dots in accordance with one embodiment of the invention. More specifically, FIG. 7 illustrates luminance measured from an angle normal to the diffuser in lumens/cm² per steradian (nits) as a function of linear displacement (in mm) along the backlight housing 19. In FIG. 7 a first plot 53 represents the spatial luminance for a standard illumination system including a T5 hot cathode fluorescent lamp and a diffuser panel. The non-uniformity illustrated by the first plot 53 is approximately 11% in this instance. In contrast, a second plot 54 represents the spatial luminance for an enhanced illumination system including a T5 hot cathode fluorescent lamp and a diffuser panel equipped with 100 μm space-modulated light reflecting dots in accordance with one embodiment. The non-uniformity illustrated by the second plot 54 is only approximately 1%.

Hitherto, the discussion for the purpose of illustration has focused on HCFL light sources. However embodiments of the invention may include or be used in conjunction with many other light sources including CCFLs, light emitting diodes (LEDs), organic light emitting diodes, lasers, etc. The light reflecting dot pattern can be modified to optimize the resulting light uniformity based upon a given type of light source and application While only certain features of the invention have been illustrated and described herein, many modifications and changes will occur to those skilled in the art. It is, therefore, to be understood that the appended claims are intended to cover such modifications and changes as fall within the true spirit of the invention.

What is claimed is:

1. An illumination system comprising:
   a backlight housing;
   a plurality of light valves coupled to the backlight housing;
   a plurality of light sources arranged in the backlight housing and optically coupled to the light valves;
   a light-scattering substrate optically coupled between the plurality of light sources and the light valves;
   a plurality of supports in contact with the light-scattering substrate to provide support to the light-scattering substrate; and
   a plurality of light modulating dots patterned on the substrate to modulate transmitted intensity of light from the plurality of light sources to achieve increased luminance uniformity by decreasing banding caused by the separated light sources, wherein a spacing between the light modulating dots increases as a distance of the light modulating dots from the center of at least one of the light sources in the backlight housing increases, and wherein the light modulating dots comprise microspheres or nanospheres having an index of refraction different than an index of refraction of the substrate.

2. The illumination system of claim 1, wherein the light-scattering substrate comprises a diffuser.

3. The illumination system of claim 1, wherein the light-scattering substrate comprises a polycarbonate resin.

4. The illumination system of claim 1, further comprising a diffuser.

5. The illumination system of claim 1, wherein the intensity transmittance of light from the plurality of light sources is modulated as a function of dot spacing or dot area, or a combination thereof.

6. An illumination system comprising:
   a backlight housing;
   a plurality of light valves coupled to the backlight housing;
   a plurality of light sources arranged in the backlight housing and optically coupled to the light valves;
   a diffuser optically coupled between the plurality of light sources and the light valves to increase illumination uniformity of light from the light sources, wherein the diffuser comprises a plurality of light modulating dots patterned to modulate transmitted intensity of light from the plurality of light sources, wherein a spacing between the light modulating dots increases as a distance of the light modulating dots from the center of at least one of the light sources in the backlight housing increases, and wherein the light modulating dots comprise microspheres or nanospheres having an index of refraction different than an index of refraction of the diffuser; and
   a plurality of supports in contact with the diffuser to provide support to the diffuser.

7. The illumination system of claim 6, wherein the light valve comprises a liquid crystal display device.

8. The illumination system of claim 7, wherein the light valve comprises a transmissive light valve.

9. The illumination system of claim 6, wherein the plurality of light sources comprise fluorescent light sources.

10. The illumination system of claim 9, wherein the plurality of light sources comprise hot cathode fluorescent light sources.

11. The illumination system of claim 9, wherein the plurality of light sources comprise T5 fluorescent light sources arranged substantially in a plane parallel to the light valve.

12. The illumination system of claim 6, wherein the reflective dots reflect light emitted from the plurality of light sources back towards the light sources and the backlight housing and the transmissive dots scatter light emitted from the plurality of light sources.

13. The illumination system of claim 6, wherein the transmissive dots scatter light emitted from the plurality of light sources substantially away from the light sources and the backlight housing.

14. The illumination system of claim 6, wherein the absorptive dots at least partially absorb light emitted from the plurality of light sources.

15. The illumination system of claim 6, wherein the light modulating dots comprise paint or ink containing highly reflective scattering materials.

16. The illumination system of claim 15, wherein the light modulating dots comprise $TiO_2$ or $AlO_2$.

17. The illumination system of claim 6, wherein the plurality of light sources comprise a diameter and wherein the plurality of light modulating dots are arranged in a pattern having a pattern width that is greater than the diameter of the light sources.

18. The illumination system of claim 17, wherein the pattern width is smaller than twice the diameter of the light sources.

19. The illumination system of claim 17, wherein the light modulating dots comprise a dot width less than about 500 μm.

20. The illumination system of claim 19, wherein the light modulating dots comprise a dot width of about 150 μm.

21. The illumination system of claim 19, wherein the light valve comprises a plurality of pixel apertures each having a pixel aperture size and wherein each of the plurality of light modulating dots comprises a dot size that is smaller than the pixel aperture size.

22. The illumination system of claim 6, wherein transmittance intensity of light from the plurality of light sources is modulated as a function of dot spacing or dot area, or a combination thereof.

23. The illumination system of claim 22, wherein the plurality of light sources are arranged parallel to each other and extend lengthwise in a first direction, and wherein and spacing between the light modulating dots varies in a second direction orthogonal to the first direction.

24. The illumination system of claim 23, wherein the spacing between the light modulating dots is periodic.

25. The illumination system of claim 23, wherein the light modulating dots are spaced such that light scattering over the light sources is increased as compared to light scattering over spaces separating the light sources.

26. The illumination system of claim 6, wherein the plurality of light sources are arranged substantially in a plane parallel to the light valves, wherein the light sources comprise at least one cold cathode fluorescent lamp or at least one light emitting diode or at least one organic light emitting diode or at least one laser.

27. An optical diffuser comprising:
a light-scattering substrate;
a plurality of supports in contact with the light-scattering substrate to provide support to the light-scattering substrate; and
a plurality of light modulating dots patterned on the substrate to modulate transmitted intensity of light from a light source to achieve increased luminance uniformity by decreasing banding caused by widely separated light sources, wherein a spacing between the light modulating dots increases as a distance of the light modulating dots from the center of at least one of the light sources increases, and wherein the light modulating dots comprise microspheres or nanospheres having an index of refraction different than an index of refraction of the substrate.

28. The optical diffuser of claim 27, wherein the light modulating dots comprise paint or ink containing highly reflective scattering materials.

29. The optical diffuser of claim 28, wherein the light modulating dots comprise $TiO_2$ or $AlO_2$.

30. The optical diffuser of claim 27, wherein the plurality of light sources comprise a diameter and wherein the plurality of light modulating dots are arranged in a pattern having a pattern width that is greater than the diameter of the light sources.

31. The optical diffuser of claim 30, wherein the pattern width is smaller than twice the diameter of the light sources.

32. The optical diffuser of claim 30, wherein the light modulating dots comprise a dot width less than about 500 μm.

33. The optical diffuser of claim 32, wherein the light modulating dots comprise a dot width of about 150 μm.

34. The optical diffuser of claim 32, wherein the light valve comprises a plurality of pixel apertures each having a pixel aperture size and wherein each of the plurality of light modulating dots comprises a dot size that is smaller than the pixel aperture size.

35. The optical diffuser of claim 27, wherein transmittance intensity of light from the plurality of light sources is modulated as a function of dot spacing, or dot area, or dot diameter, or a combination thereof.

36. The optical diffuser of claim 35, wherein the plurality of light sources are parallel to each other and extend lengthwise in a first direction, and wherein and spacing between the light modulating dots varies in a second direction orthogonal to the first direction.

37. The optical diffuser of claim 36, wherein the spacing between the light modulating dots is periodic.

38. The optical diffuser of claim 27, wherein the light-scattering substrate comprises a polycarbonate resin.

* * * * *